US012790888B2

(12) United States Patent
Johnson et al.

(10) Patent No.: US 12,790,888 B2
(45) Date of Patent: Nov. 10, 2026

(54) HYBRID RETRACTABLE LIFT SYSTEM FOR A WINDOW COVERING

(71) Applicant: Springs Window Fashions, LLC, Middleton, WI (US)

(72) Inventors: Dustin Anthony Johnson, Madison, WI (US); Michael Allen Graybar, Madison, WI (US)

(73) Assignee: Springs Window Fashions, LLC, Middleton, WI (US)

(*) Notice: Subject to any disclaimer, the term of this patent is extended or adjusted under 35 U.S.C. 154(b) by 124 days.

(21) Appl. No.: 18/589,313

(22) Filed: Feb. 27, 2024

(65) Prior Publication Data

US 2024/0287851 A1 Aug. 29, 2024

Related U.S. Application Data

(60) Provisional application No. 63/487,219, filed on Feb. 27, 2023.

(51) Int. Cl.
*E06B 9/322* (2006.01)
*E06B 9/262* (2006.01)

(52) U.S. Cl.
CPC .............. *E06B 9/322* (2013.01); *E06B 9/262* (2013.01); *E06B 2009/2627* (2013.01); *E06B 2009/3222* (2013.01); *E06B 2009/3225* (2013.01)

(58) Field of Classification Search
CPC . E06B 9/32; E06B 9/326; E06B 9/322; E06B 9/262; E06B 2009/2627;
(Continued)

(56) References Cited

U.S. PATENT DOCUMENTS

| | | | | |
|---|---|---|---|---|
| 3,605,852 A * | 9/1971 | Vecchiarelli | E06B 9/322 160/176.1 R |
| 5,184,660 A * | 2/1993 | Jelic | E06B 9/322 160/171 |

(Continued)

FOREIGN PATENT DOCUMENTS

| | | | | |
|---|---|---|---|---|
| AU | 2023355045 A1 * | 4/2025 | E06B 9/307 |
| CA | 2353290 C * | 6/2009 | E06B 9/322 |

(Continued)

OTHER PUBLICATIONS

International Search Report and Written Opinion for Application No. PCT/US2024/017554 dated Jun. 26, 2024 (16 pages).

*Primary Examiner* — Johnnie A. Shablack
(74) *Attorney, Agent, or Firm* — Michael Best & Friedrich LLP

(57) ABSTRACT

A window covering includes a first rail, a second rail moveable relative to the first rail, a drive shaft, a spring motor operably connected to the drive shaft, and a retractable cord lift assembly operably connected to the drive shaft and including a spool member operably connected to a wand assembly by a cord, a clutch connected to the spool member and configured to selectively engage the drive shaft. The second rail is configured to be repositioned relative to the first rail, and in response the drive shaft is configured to rotate relative to the clutch in a first direction and a second direction. Actuation of the wand assembly is configured to rotate the spool member in the first direction, and in response the clutch is configured to engage the drive shaft to rotate the drive shaft in the first direction, moving the second rail relative to the first rail.

21 Claims, 7 Drawing Sheets

(58) Field of Classification Search
CPC ..... E06B 2009/2625; E06B 2009/2622; E06B 2009/3222; E06B 2009/3225; E06B 9/74
See application file for complete search history.

(56) References Cited

U.S. PATENT DOCUMENTS

| | | | | | |
|---|---|---|---|---|---|
| 6,129,131 | A * | 10/2000 | Colson | E06B 9/262 160/171 |
| 6,536,503 | B1 * | 3/2003 | Anderson | E06B 9/322 242/375.3 |
| 6,622,769 | B2 * | 9/2003 | Judkins | E06B 9/322 160/84.05 |
| 7,143,802 | B2 | 12/2006 | Strand et al. | |
| 7,287,570 | B2 * | 10/2007 | Strand | E06B 9/322 160/171 |
| 7,886,803 | B2 * | 2/2011 | Anderson | E06B 9/80 160/170 |
| 8,356,653 | B2 * | 1/2013 | Fu-Lai | E06B 9/322 160/84.05 |
| 8,746,320 | B2 * | 6/2014 | Yu | E06B 9/322 160/300 |
| 9,062,492 | B2 * | 6/2015 | Yu | E06B 9/322 |
| 9,187,951 | B2 * | 11/2015 | Yu | E06B 9/90 |
| 9,284,774 | B2 * | 3/2016 | Yu | E06B 9/322 |
| 9,528,318 | B2 * | 12/2016 | Huang | E06B 9/262 |
| 9,605,477 | B2 * | 3/2017 | Huang | E06B 9/322 |
| 9,657,517 | B2 * | 5/2017 | Huang | E06B 9/32 |
| 9,732,555 | B2 | 8/2017 | Morris | |
| 9,765,864 | B2 * | 9/2017 | Yu | E06B 9/78 |
| 9,938,764 | B2 * | 4/2018 | Huang | F16H 3/54 |
| 9,988,837 | B2 * | 6/2018 | Defenbaugh | E06B 9/322 |
| 10,655,384 | B2 * | 5/2020 | Foley | E06B 9/60 |
| 11,299,929 | B2 * | 4/2022 | Chen | E06B 9/323 |
| 11,643,849 | B2 * | 5/2023 | Magro | E06B 9/74 160/310 |
| 11,686,151 | B2 * | 6/2023 | Graybar | E06B 9/42 160/310 |
| 11,767,712 | B2 * | 9/2023 | Huang | E06B 9/322 160/84.02 |
| 11,879,294 | B2 * | 1/2024 | Huang | E06B 9/262 |
| 11,905,758 | B2 * | 2/2024 | Graybar | E06B 9/78 |
| 2005/0109471 | A1 * | 5/2005 | Strand | E06B 9/322 160/170 |
| 2007/0051477 | A1 * | 3/2007 | Fraser | E06B 9/32 160/84.05 |
| 2009/0020239 | A1 * | 1/2009 | Yu | E06B 9/322 160/331 |
| 2009/0120592 | A1 * | 5/2009 | Lesperance | E06B 9/322 160/84.02 |
| 2009/0120593 | A1 * | 5/2009 | Lesperance | E06B 9/322 160/84.02 |
| 2009/0255637 | A1 * | 10/2009 | Yu | E06B 9/322 160/331 |
| 2014/0014279 | A1 * | 1/2014 | Defenbaugh | E06B 9/68 160/168.1 P |
| 2014/0069596 | A1 * | 3/2014 | Ng | E06B 9/42 160/305 |
| 2017/0198520 | A1 | 7/2017 | Anderson et al. | |
| 2018/0320438 | A1 | 11/2018 | Anderson et al. | |
| 2023/0313605 | A1 * | 10/2023 | Huang | E06B 9/262 160/84.01 |
| 2024/0052694 | A1 * | 2/2024 | Huang | E06B 9/322 |
| 2024/0110439 | A1 * | 4/2024 | Colson | E06B 9/32 |
| 2024/0159105 | A1 * | 5/2024 | Nien | E06B 9/322 |
| 2024/0328253 | A1 * | 10/2024 | Wang | E06B 9/78 |

FOREIGN PATENT DOCUMENTS

| | | | | |
|---|---|---|---|---|
| JP | 2012026262 A | * | 2/2012 | |
| WO | WO-2012007094 A1 | * | 1/2012 | E06B 9/262 |
| WO | WO-2012026912 A1 | * | 3/2012 | E06B 9/322 |

* cited by examiner

HYBRID RETRACTABLE LIFT SYSTEM FOR A WINDOW COVERING

CROSS-REFERENCE TO RELATED APPLICATIONS

This application claims priority to U.S. Patent Application No. 63/487,219, filed on Feb. 27, 2023 and titled "Hybrid Retractable Lift System for a Window Covering," the contents of which is hereby incorporated by reference in its entirety.

FIELD

The present disclosure relates to a lift system for a window covering. More specifically, the disclosure relates to a hybrid lift system that allows for dual manual operation of the window covering in response to either manual repositioning of a bottom rail or manual actuation of a retractable cord lift system.

SUMMARY

In one example of an embodiment, a window covering includes a first rail, a second rail moveable relative to the first rail, a drive shaft received by the first rail, a spring motor operably connected to the drive shaft, the spring motor configured to apply tension to the drive shaft to assist with maintaining a position of the second rail relative to the first rail, a lift drum operably connected to the drive shaft, a lift cord extending between the lift drum and the second rail, and a retractable cord lift assembly operably connected to the drive shaft, the retractable cord lift assembly including a spool member operably connected to a wand assembly by a cord, a clutch connected to the spool member, the clutch configured to selectively engage the drive shaft. In a first operational configuration, the second rail is configured to be manually repositioned relative to the first rail, and in response the drive shaft is configured to rotate relative to the clutch in a first direction and a second direction. In a second operational configuration, actuation of the wand assembly is configured to rotate the spool member in the first direction, and in response the clutch is configured to engage the drive shaft to rotate the drive shaft in the first direction, moving the second rail relative to the first rail.

In another example of an embodiment, a window covering including a first rail, a second rail moveable relative to the first rail, a drive shaft received by the first rail, a spring motor operably connected to the drive shaft, the spring motor configured to apply tension to the drive shaft to assist with maintaining a position of the second rail relative to the first rail, and a retractable cord lift assembly operably connected to the drive shaft, the retractable cord lift assembly including a first spool member operably connected to a first wand assembly by a first cord, a first clutch connected to the first spool member, the first clutch configured to selectively engage the drive shaft, and a second spool member operably connected to a second wand assembly by a second cord, a second clutch connected to the second spool member, the second clutch configured to selectively engage the drive shaft. In a first operational configuration, the second rail is configured to be manually repositioned relative to the first rail, and in response the drive shaft is configured to rotate relative to the first clutch and the second clutch in both a first direction and a second direction. In a second operational configuration, actuation of the first wand assembly is configured to rotate the first spool member in the first direction, and in response the first clutch is configured to engage the drive shaft to rotate the drive shaft in the first direction, moving the second rail towards the first rail, and actuation of the second wand assembly is configured to rotate the second spool member in the second direction, and in response the second clutch is configured to engage the drive shaft to rotate the drive shaft in the second direction, moving the second rail away from the first rail.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
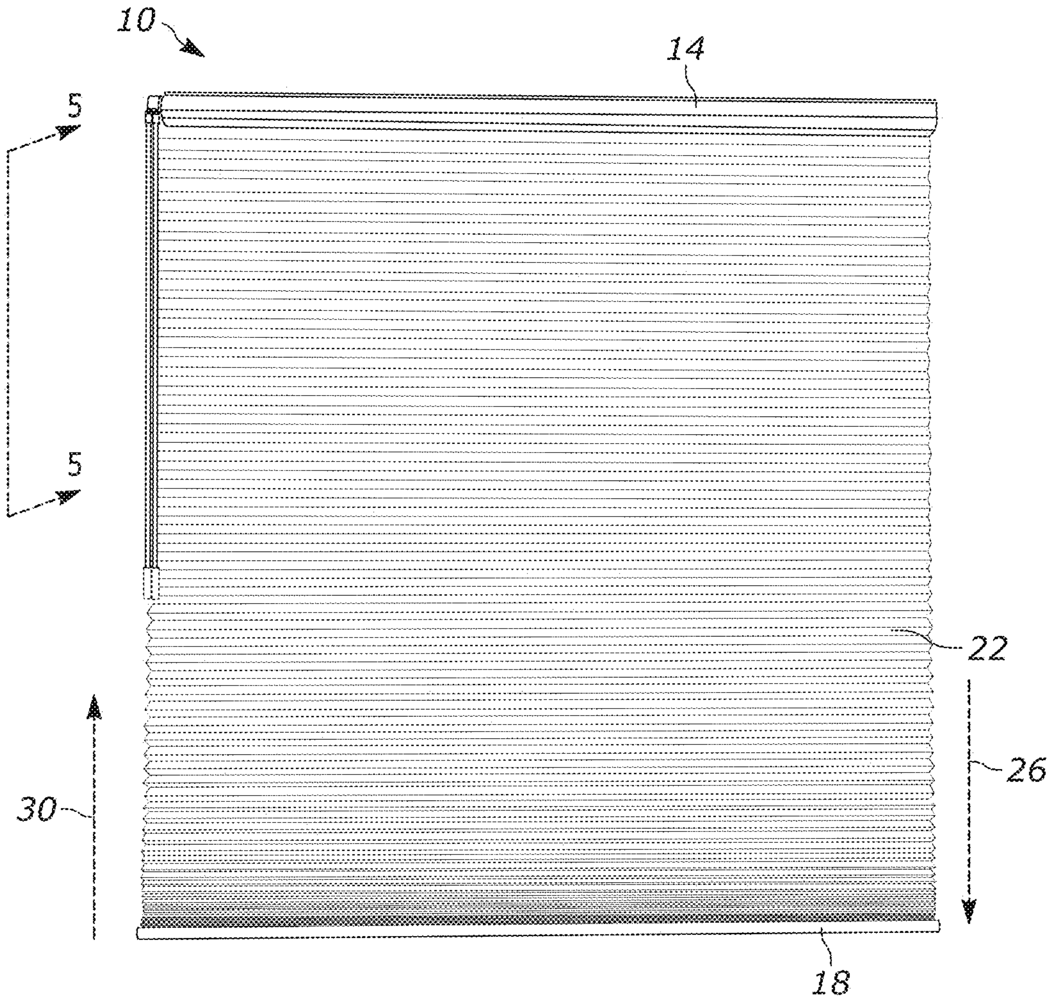
FIG. 1 is a perspective view of an example of an embodiment of a window covering that incorporates a hybrid retractable lift system disclosed herein.

With reference now to FIG. 1, an example of an embodiment of a window covering 10 is illustrated. The window covering 10 includes a headrail 14 (or a first rail 14), a bottom rail 18 (or a second rail 18), and a window shade panel 22. The window shade panel 22 extends between the headrail 14 and the bottom rail 18. In the illustrated embodiment, the window shade panel 22 is illustrated as a cellular shade. It should be appreciated that a cellular shade is provided for purposes of illustration. The window shade panel 22 (also referred to as a window shade 22 or a shade panel 22 or covering material 22) can be any suitable window shade, window covering, window blind, window shade panel, or covering for an architectural opening and can include, but is not limited to, a roller shade, a cellular shade, a solar shade, a roman shade, a sheer shade, a bottom-up top-down shade, etc. In addition, the illustrated window shade panel 22 can also be referred to as a cordless window shade.

The window shade panel 22 is configured to travel in a first direction 26 and a second direction 30. The first direction 26 is opposite the second direction 30. In the illustrated embodiment, the first direction 26 is a direction of travel away from the headrail 14. The second direction 30 is a direction of travel towards the headrail 14.

Figure 2:
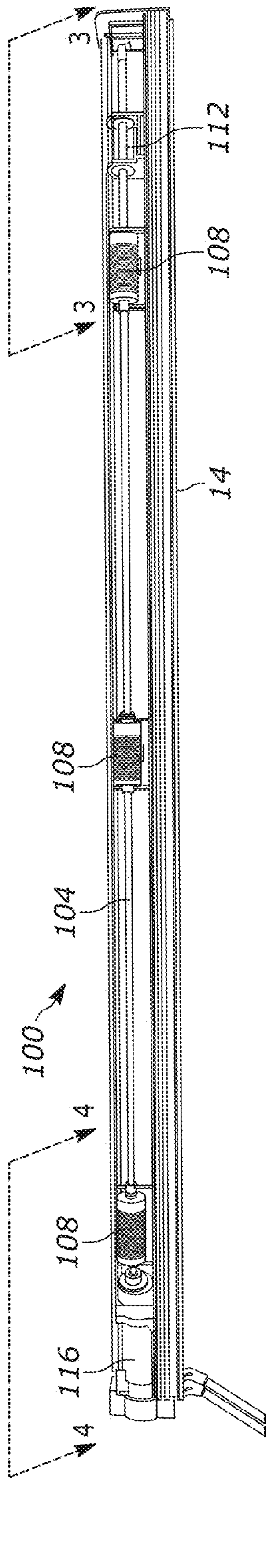
FIG. 2 is a top-down view of a headrail of the window covering of FIG. 1 with a headrail cover removed to illustrate the hybrid retractable lift system.

With reference now to FIG. 2, the headrail 14 is illustrated with a headrail cover (not shown) removed. The headrail 14 houses a hybrid retractable lift system 100. The hybrid retractable lift system 100 includes a drive shaft 104. At least one lift cord cradle assembly 108 (or lift cord assembly 108) is operably connected to the drive shaft 104. In the illustrated embodiment, a plurality of lift cord cradle assemblies 108 are operably connected to the drive shaft 104, and more specifically three lift cord cradle assemblies 108 are operably connected to the drive shaft 104. In other examples of embodiments, any suitable number of lift cord cradle assemblies 108 are operably connected to the drive shaft 104. Generally, the width of the window shade panel 22 will require fewer or more lift cord cradle assemblies 108. Each lift cord cradle assembly 108 is configured to selectively unwind and/or wind a lift cord in response to movement of the bottom rail 18 moving in the first direction 26 and/or the second direction 30, respectively. A spring motor 112 is also operably connected to the drive shaft 104. In addition, a retractable cord lift assembly 116 is operably connected to the drive shaft 104.

Figure 3:
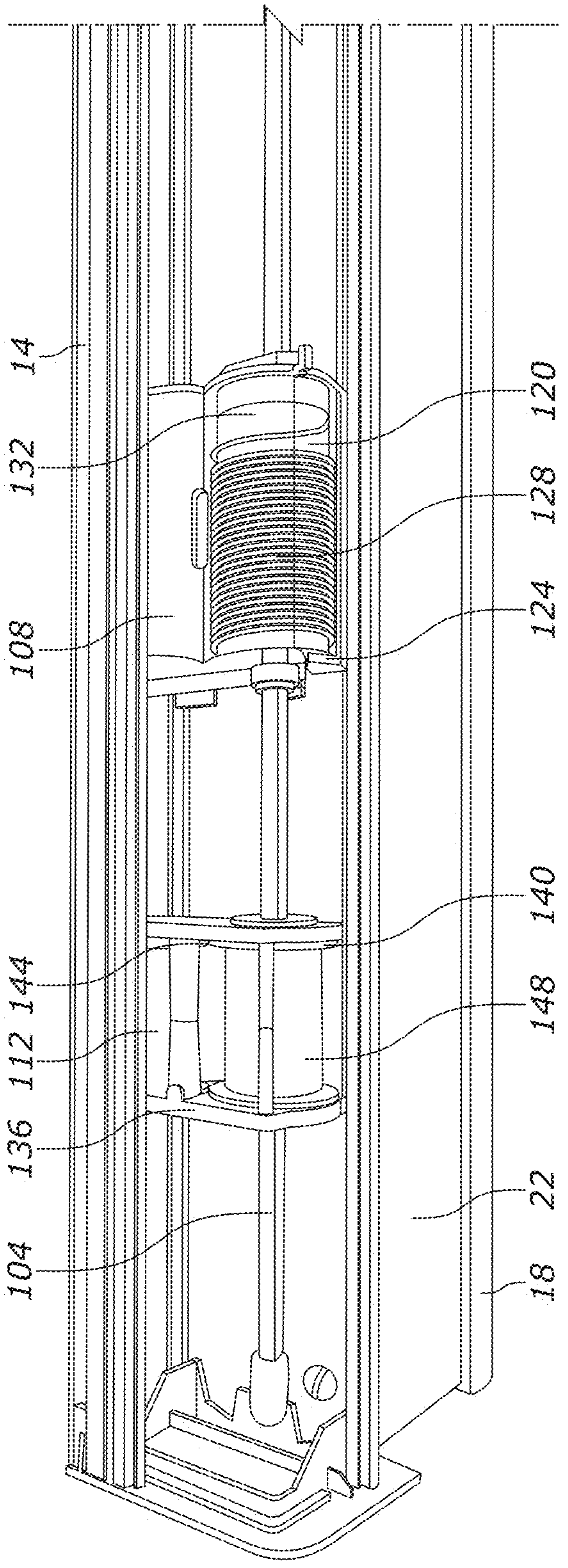
FIG. 3 is a perspective view of a portion of the hybrid retractable lift system of FIG. 2, take along view 3-3 of FIG. 2.

With reference to FIG. 3, each lift cord cradle assembly 108 includes a lift drum 120 that is operably connected to the drive shaft 104. The lift drum 120 is received by a cradle 124. Each lift drum 120 is configured to rotate relative to the cradle 124. More specifically, the lift drum 120 is configured to rotate in response to rotation of the drive shaft 104. A lift cord 128 is configured to wind around the lift drum 120. The lift cord 128 extends from the lift drum 120 through the headrail 14, through the window shade panel 22, and fastens to the bottom rail 18. A cover 132 is fastened to the cradle 124 and is configured to guide the lift cord 128 onto and off of the lift drum 120 as the lift cord 128 is wound onto and/or unwound off the lift drum 120. It should be appreciated that each lift cord cradle assembly 108 of the hybrid retractable lift system 100 is identical. Accordingly, the illustrated hybrid retractable lift system 100 includes three lift cord cradle assemblies 108, each with an associated lift cord 128 fastened to the bottom rail 18.

The spring motor 112 (or power assembly 112) includes a cradle 136 that carries a first drum 140 and a second drum 144. Each drum 140, 144 is configured to rotate relative to the cradle 136. In addition, the first drum 140 is operably connected to the drive shaft 104. The first drum 140 is configured to rotate in response to rotation of the drive shaft 104. A spring member 148 (or a tensioning member 148) extends between the first and second drums 140, 144. More specifically, the spring member 148 is rolled and unrolled from the first drum 140 to the second drum 144 in response to rotation of the drive shaft 104. As such, the spring member 148 is configured to apply tension to the drive shaft 104 (or apply a biasing force to the drive shaft 104). In addition, the spring member 148 is configured to store energy that can be utilized to assist lifting the window shade panel 22 from a more extended position to a more retracted position. Stated another way, the spring motor 112 is drivingly coupled to the drive shaft 104. The spring motor 112 is configured to apply tension, or a biasing force, to the bottom rail 18. The tension (or biasing force) is applied to restrict rotation of the drive shaft 104. This maintains a desired position of the bottom rail 18 relative to the headrail 14. The tension (or biasing force) applied is sufficient to maintain the desired position of the bottom rail 18 relative to the headrail 14, while also assisting a user with lifting (or adjusting a position of) the bottom rail 18 relative to the headrail 14 to facilitate operation of the window covering 10, as described herein. It should be appreciated that U.S. Pat. Nos. 7,143,802 and 9,732,555 provide additional disclosure regarding the components of the spring motor 112, the disclosure of each of which is hereby incorporated by reference in its entirety.

Figure 4:
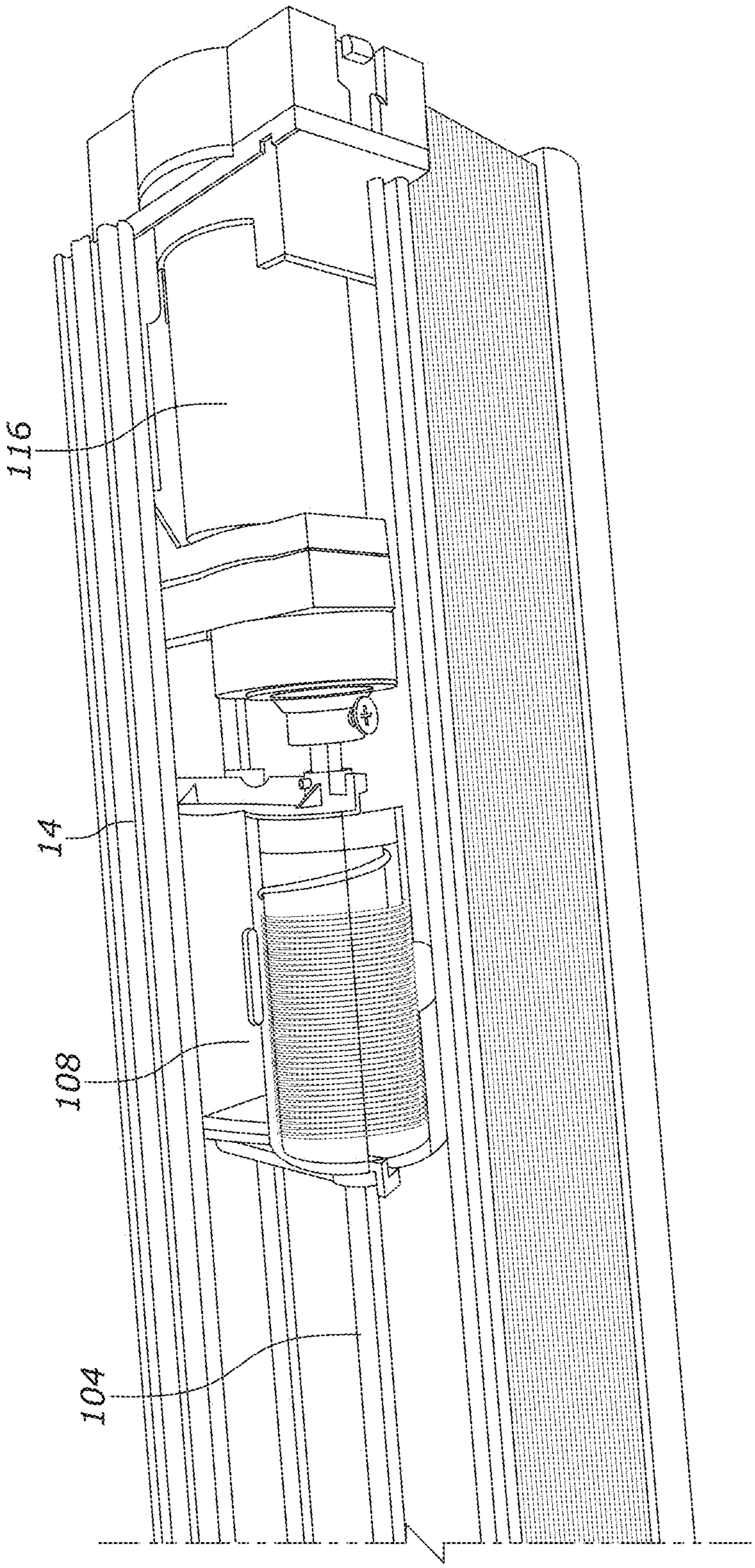
FIG. 4 is a perspective view of a portion of the hybrid retractable lift system of FIG. 2, take along view 4-4 of FIG. 2.
Figure 5:
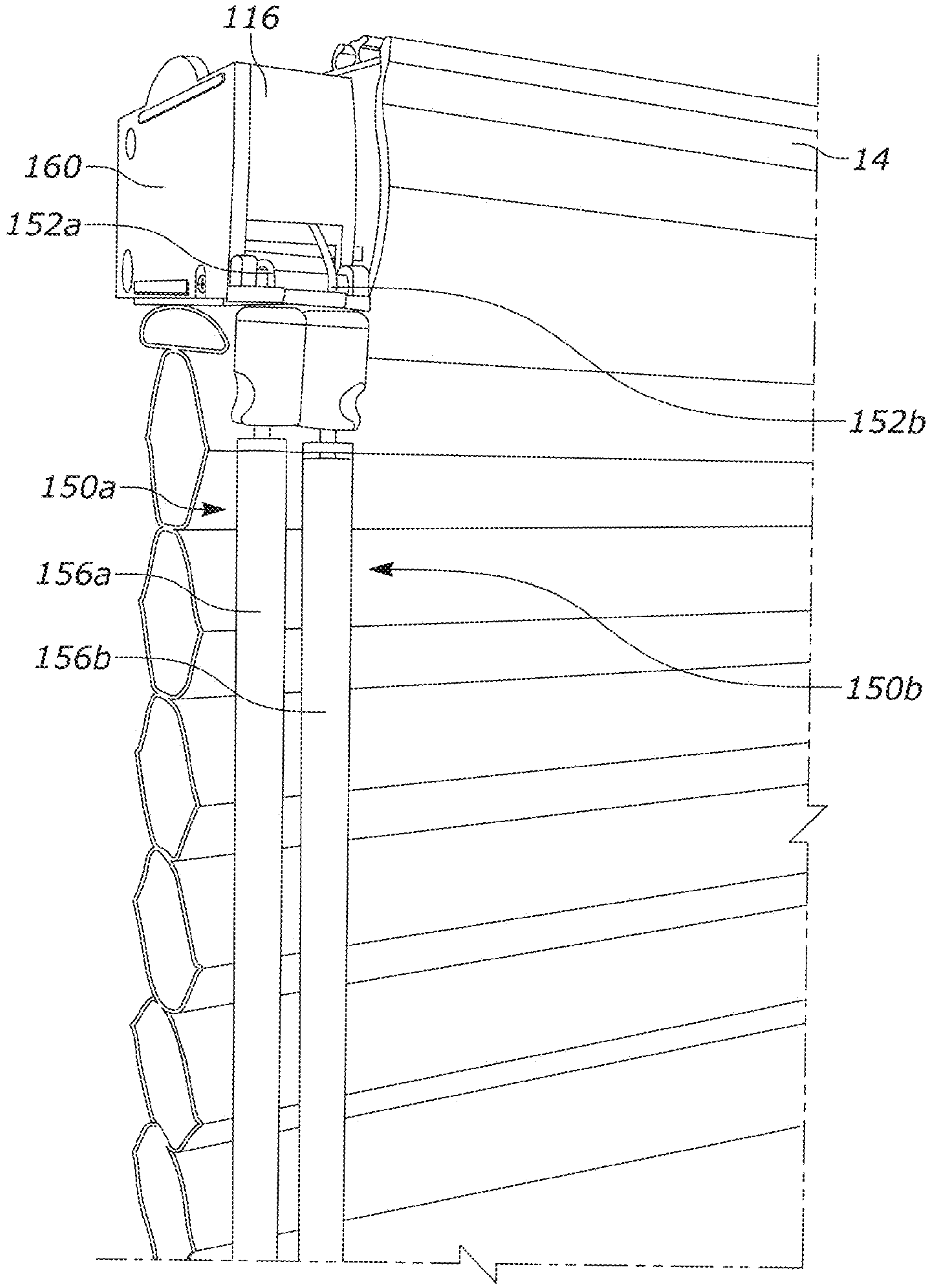
FIG. 5 is a perspective view of a portion of the hybrid retractable lift system of FIG. 2, take along view 5-5 of FIG. 1.

With reference to FIG. 4, the retractable cord lift assembly 116 is operably connected to the drive shaft 104. In the illustrated embodiment, the retractable cord lift assembly 116 is coupled to an end of the headrail 14. More specifically, the retractable cord lift assembly 116 is partially received by one end of the headrail 14. With reference now to FIG. 5, the retractable cord lift assembly 116 includes a first wand assembly 150*a* and a second wand assembly 150*b*. To this end, the retractable cord lift assembly 116 can be referred to as a retractable dual cord lift assembly 116. In the illustrated embodiment, the first wand assembly 150*a* is configured to facilitate rotation of the drive shaft 104 in a first direction when actuated. The second wand assembly 150*b* is configured to facilitate rotation of the drive shaft 104 in a second direction, opposite the first direction, when actuated. For example, actuation of the first wand assembly 150*a* can facilitate movement of the bottom rail 18 in the first direction 26 (shown in FIG. 1). Actuation of the second wand assembly 150*b* can facilitate movement of the bottom rail 18 in the second direction 30 (shown in FIG. 1). It should be appreciated that while the illustrated embodiment of the retractable cord lift assembly 116 illustrated a dual wand assembly (or a two wand assembly), the retractable cord lift assembly 116 can include a single wand assembly. For example, in one embodiment, the retractable cord lift assembly 116 can include the first wand assembly 150*a*. In another example of an embodiment, the retractable cord lift assembly 116 can include the second wand assembly 150*b*. Accordingly, the retractable cord lift assembly 116 can include at least one wand assembly 150*a* or 150*b*.

With continued reference to FIG. 5, the first wand assembly 150*a* includes a first cord 152*a*. A first wand 156*a* is fastened to the first cord 152*a*. The second wand assembly 150*b* includes a second cord 152*b*. A second wand 156*b* is fastened to the second cord 152*b*. The cords 152*a*, 152*b* extend into a housing 160.

Figure 6:
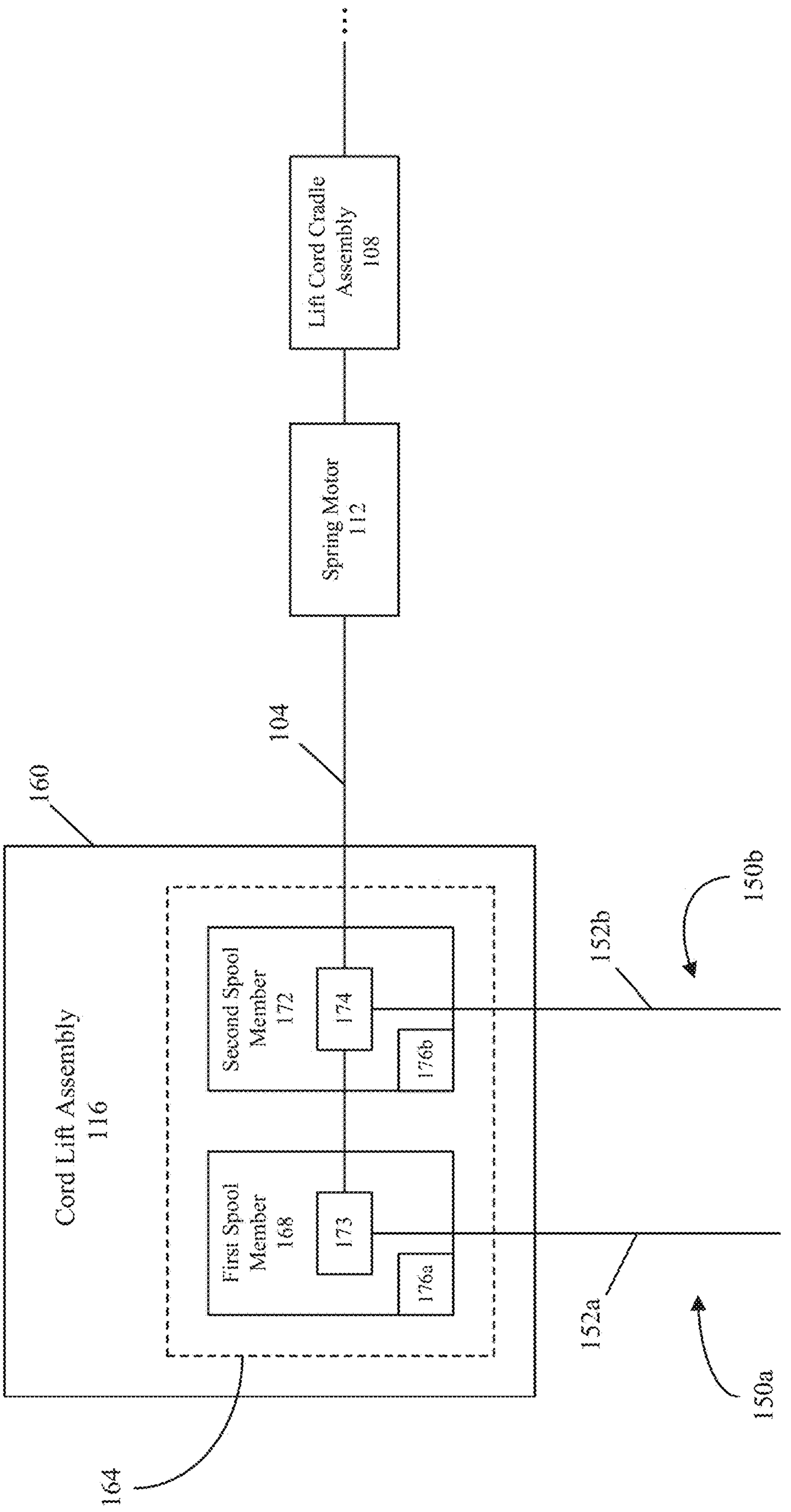
FIG. 6 is a schematic view of a portion of the hybrid retractable lift system of FIG. 2, illustrating a cord lift assembly, spring motor, and lift cord cradle assembly connected by a drive shaft and received in a portion of a headrail.

With reference now to FIG. 6, the retractable cord lift assembly 116 includes a actuation assembly 164. The actuation assembly 164 is configured to translate actuation of each wand assembly 150*a*, 150*b* into rotational movement to facilitate rotation of the drive shaft 104. The actuation assembly 164 includes a first spool member 168 and a second spool member 172. The first spool member 168 is configured to carry the first cord 152*a* of the first wand assembly 150*a*. The second spool member 172 is configured to carry the second cord 152*b* of the second wand assembly 150*b*.

The first spool member 168 includes a first clutch member 173. In the illustrated embodiment, the first spool member 168 defines an aperture that receives the first clutch member 173. Accordingly, the first clutch member 173 and the first spool member 168 are concentric. The first clutch member 173 is configured to engage the drive shaft 104 in response to rotation of the first spool member 168 in a first direction. The first clutch member 173 is also configured not to engage the drive shaft 104 in response to rotation of the drive shaft 104 relative to the first spool member 168. Accordingly, the first clutch member 173 is a one-way clutch (or a one-way slip clutch, a one-way bearing, a Sprag clutch, a freewheel clutch, a cam clutch, an overrunning clutch, etc.). For example, the first clutch member 173 is not in engagement with the drive shaft 104 when in a first position. This allows the drive shaft 104 to rotate relative to the first clutch member 173, and in turn the first spool member 168, when the first spool member 168 is not rotated. In response to rotation of the first spool member 168, for example in response to actuation of the first wand assembly 150*a*, the first clutch member 173 responsively rotates with the first spool member 168. As the first clutch member 173 rotates, the first clutch member 173 engages the drive shaft 104. The engagement can be by any known or suitable structural engagement, such as utilizing a pawl, friction, a spring, drag, or any other structure to selectively engage the drive shaft 104. In response to continued rotation of the first spool member 168, the first clutch member 173 is engaged with and responsively rotates the drive shaft 104. When actuation of the first wand assembly 150*a* is complete, the first spool member 168 rotates in a second direction, opposite the first direction. For example, a biasing member 176*a* (or first biasing member 176*a*) can be operably connected to the first spool member 168. Rotation of the first spool member 168 in the first direction overcomes the bias applied on the first spool member 168 by the biasing member 176*a*. In response to actuation of the first wand assembly 150*a* being complete, the biasing member 176*a* applies (or reapplies) the biasing force to the first spool member 168, facilitating rotation of the first spool member 168 in the second direction. Rotation of the first spool member 168 in the second direction results in the first clutch member 173 disengaging with the drive shaft 104. Thus, in response to rotation of the first spool member 168 and the first clutch member 173 in the first direction, the drive shaft 104 rotates in the first direction. In response to rotation of the first spool member 168 and the first clutch member 173 in the second direction, the first spool member 168 and the first clutch member 173 rotate in the second direction relative to the drive shaft 104, as the drive shaft 104 does not rotate since the first clutch member 173 is disengaged with the drive shaft 104.

The second spool member 172 includes a second clutch member 174. In the illustrated embodiment, the second spool member 172 defines an aperture that receives the second clutch member 174. Accordingly, the second clutch member 174 and the second spool member 172 are concentric. The second clutch member 174 is configured to engage the drive shaft 104 in response to rotation of the second spool member 172 in a second direction. The second clutch member 174 is also configured not to engage the drive shaft 104 in response to rotation of the drive shaft 104 relative to the second spool member 172. Accordingly, the second clutch member 174 is a one-way clutch (or a one-way slip clutch, a one-way bearing, a Sprag clutch, a freewheel clutch, a cam clutch, an overrunning clutch, etc.). For example, the second clutch member 174 is not in engagement with the drive shaft 104 when in a first position. This allows the drive shaft 104 to rotate relative to the second clutch member 174, and in turn the second spool member 172, when the second spool member 172 is not rotated. In response to rotation of the second spool member 172, for example in response to actuation of the second wand assembly 150*b*, the second clutch member 174 responsively rotates with the second spool member 172. As the second clutch member 174 rotates, the second clutch member 174 engages the drive shaft 104. The engagement can be by any known or suitable structural engagement, such as utilizing a pawl, friction, a spring, drag, or any other structure to selectively engage the drive shaft 104. In response to continued rotation of the second spool member 172, the second clutch member 174 is engaged with and responsively rotates the drive shaft 104. When actuation of the second wand assembly 150*b* is complete, the second spool member 172 rotates in a first direction, opposite the second direction. For example, a biasing member 176*b* (or second biasing member 176*b*) can be operably connected to the second spool member 172. Rotation of the second spool member 172 in the second direction overcomes the bias applied on the second spool member 172 by the biasing member 176*b*. In response to actuation of the second wand assembly 150*b* being complete, the biasing member 176*b* applies (or reapplies) the biasing force to the second spool member 172, facilitating rotation of the second spool member 172 in the first direction. Rotation of the second spool member 172 in the first direction results in the second clutch member 174 disengaging with the drive shaft 104. Thus, in response to rotation of the second spool member 172 and the second clutch member 174 in the second direction, the drive shaft 104 rotates in the second direction. In response to rotation of the second spool member 172 and the second clutch member 174 in the first direction, the second spool member 172 and the second clutch member 174 rotate in the first direction relative to the drive shaft 104, as the drive shaft 104 does not rotate since the second clutch member 174 is disengaged with the drive shaft 104.

Each cord 152*a*, 152*b* is configured to wind and unwind from the respective spool member 168, 172. For example, in response actuation of the first wand assembly 150*a*, the first cord 152*a* unwinds from the first spool member 168. This causes the first spool member 168 to rotate in the first direction. Termination of actuation of the first wand assembly 150*a* results in the first spool member 168 rotating in the second direction, with the first cord 152*a* winding onto the first spool member 168. As another example, in response actuation of the second wand assembly 150*b*, the second cord 152*b* unwinds from the second spool member 172. This causes the second spool member 172 to rotate in the second direction. Termination of actuation of the second wand assembly 150*b* results in the second spool member 172 rotating in the first direction, with the second cord 152*b* winding onto the second spool member 172. Thus it should be appreciated that the spool members 168, 172 are configured to rotate in opposite directions (or opposing directions) in response to actuation of each respective wand assembly 150*a*, 150*b*.

Figure 7:
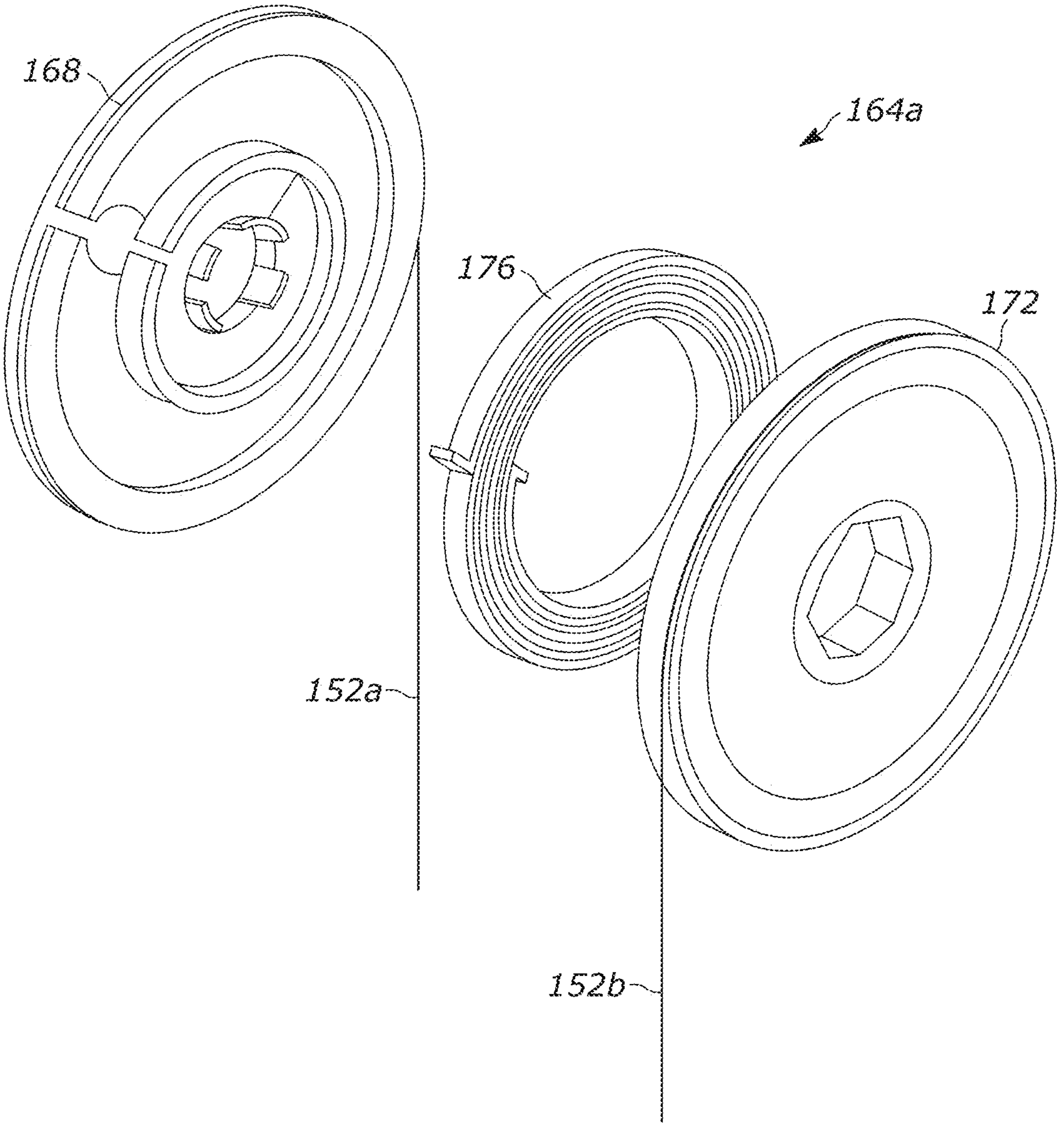
FIG. 7 is a partially exploded view of a portion of another example of an embodiment of an actuation assembly for use in the hybrid retractable lift system of FIG. 6, the actuation assembly not showing the clutch members for clarity.

With reference to FIG. 7, an alternative embodiment of the actuation assembly 164*a* is illustrated. The actuation assembly 164*a* is the same as actuation assembly 164, except that instead of each spool member 168, 172 having a separate biasing member 176*a*, 176*b*, a single biasing member 176 is provided. A first end of the biasing member 176 is fastened to the first spool member 168, while a second end of the biasing member 176 is fastened to the second spool member 172. Each spool member 168, 172 is configured to rotate in an opposing direction. For example, the first spool member 168 is configured to rotate clockwise from a start position to an end position, while the second spool member 172 is configured to rotate counterclockwise from a start position to an end position. The biasing member 176 is configured to return the respective spool member 168, 172 from the end position back to the start position after rotation. The biasing member 176 is illustrated as a spiral torsion spring.

In operation, the hybrid retractable lift system 100 provides for two systems of operation (or two methods of operation or dual operation). In a first system of operation, the bottom rail 18 can be grasped by a user and repositioned in the first direction 26 or the second direction 30. As the bottom rail 18 is moved away from the headrail 14 in the first direction 26, the window shade panel 22 extends. More specifically, each lift cord 128 unwinds from the associated lift drum 120, rotating each lift drum 120. In turn, the drive shaft 104 rotates in response to rotation of each lift drum 120. The drums 140, 144 of the spring motor 112 rotate in response to rotation of the drive shaft 104, with the spring member 148 applying tension (or force) onto the drive shaft 104 to assist with maintaining the position of the bottom rail 18. It should be appreciated that the drive shaft 104 rotates relative to the retractable cord lift assembly 116. More specifically, the drive shaft 104 rotates without engagement with the first spool member 168 or the second spool member 172. Thus, the drive shaft 104 rotates relative to each spool member 168, 172, and further relative to each associated clutch member 173, 174. Stated another way, the drive shaft 104 rotates without resulting in engagement or rotation of an associated spool member 168, 172 of the retractable cord lift assembly 116.

As the bottom rail 18 is moved towards the headrail 14 in the second direction 30, the window shade panel 22 retracts. More specifically, each lift cord 128 winds onto the associated lift drum 120, rotating each lift drum 120. Rotation of the lift drum 120 is facilitated by the tension applied by the spring motor 112. The drive shaft 104 rotates in response to rotation of each lift drum 120. The drums 140, 144 of the spring motor 112 also rotate in response to rotation of the drive shaft 104, with the spring member 148 applying tension (or force) onto the drive shaft 104 to assist with maintaining the position of the bottom rail 18 at a desired position relative to the headrail 14. It should be appreciated that the drive shaft 104 again rotates relative to the retractable cord lift assembly 116. More specifically, the drive shaft 104 rotates without engagement with the first spool member 168 or the second spool member 172. Thus, the drive shaft 104 rotates relative to each spool member 168, 172, and further relative to each associated clutch member 173, 174. Stated another way, the drive shaft 104 rotates without resulting in engagement or rotation of an associated spool member 168, 172 of the retractable cord lift assembly 116.

In a second system of operation, the position of the bottom rail 18 can be adjusted in response to actuation of the retractable cord lift assembly 116. As one example, the user can actuate the first wand assembly **150*a*. More specifically, the user can actuate the first wand 156*a*, withdrawing the first cord 152*a* from engagement with the first spool member 168. In response to actuation and withdrawal of the first cord 152*a*, the first cord 152*a* unwinds from the first spool member 168. As the first cord 152*a* unwinds, the first spool member 168 rotates in the first direction, such as from the start position towards the end position. Rotation of the first spool member 168 in the first direction results in rotation of the first clutch member 173. As the first clutch member 173 rotates, the first clutch member 173 engages the drive shaft 104, resulting in rotation of the drive shaft 104 in the first direction. As the drive shaft 104 rotates in the first direction, each lift drum 120 rotates, unwinding each lift cord 128 and lowering the bottom rail 18 in the first direction 26 away from the headrail 14. The drums 140, 144 of the spring motor 112 also rotate in response to rotation of the drive shaft 104, with the spring member 148 applying tension (or force) onto the drive shaft 104 to assist with maintaining the position of the bottom rail 18. When the first spool member 168 reaches the end position, the biasing member 176*a* counterrotates the first spool member 168 in the second direction (or from the end position to the start position). During counterrotation, the spring motor 112 applies sufficient force on the drive shaft 104 to hold the bottom rail 18 in place. Stated another way, the spring motor 112 restricts back driving of the drive shaft 104. Back driving is undesirable, as it changes the position of the bottom rail 18 in a direction opposite of the desired direction. In the current embodiment, the bottom rail 18 moves in the second direction 30 towards the headrail 14, which is opposite the desired first direction 26 of movement. In addition, the first clutch member 173 facilitates counterrotation of the first spool member 168 without back rotation of the drive shaft 104. As the first spool member 168 counterrotates in the second direction, back to the start position, the first clutch member 173 disengages the drive shaft 104. Thus, the first spool member 168 and the first clutch member 173 counterrotate relative to the drive shaft 104. The first cord 152*a* retracts into the actuation assembly 164, where it is wound back onto the first spool member 168. The user can then repeat the process of actuating the first wand 156*a* to pull the first cord 152*a*, further lowering the bottom rail 18 in the first direction 26 until reaching a desired position. As the bottom rail 18 is moved away from the headrail 14 in the first direction 26, the window shade panel 22** extends.

As another example, the user can actuate the second wand assembly **150*b*. More specifically, the user can actuate the second wand 156*b*, withdrawing the second cord 152*b* from engagement with the second spool member 172. In response to actuation and withdrawal of the second cord 152*b*, the second cord 152*b* unwinds from the second spool member 172. As the second cord 152*b* unwinds, the second spool member 172 rotates in the second direction, such as from the start position towards the end position. Rotation of the second spool member 172 in the second direction results in rotation of the second clutch member 174. As the second clutch member 174 rotates, the second clutch member 174 engages the drive shaft 104, resulting in rotation of the drive shaft 104 in the second direction. As the drive shaft 104 rotates in the second direction, each lift drum 120 rotates, winding each lift cord 128 and raising the bottom rail 18 in the second direction 30 towards the headrail 14. The drums 140, 144 of the spring motor 112 also rotate in response to rotation of the drive shaft 104, with the spring member 148 applying tension (or force) onto the drive shaft 104 to assist with maintaining the position of the bottom rail 18. When the second spool member 172 reaches the end position, the biasing member 176*b* counterrotates the second spool member 172 in the first direction (or from the end position to the start position). During counterrotation, the spring motor 112 applies sufficient force on the drive shaft 104 to hold the bottom rail 18 in place. Stated another way, the spring motor 112 restricts back driving of the drive shaft 104. In the current embodiment, undesirable back driving would result in the bottom rail 18 moving in the first direction 26 away from the headrail, which is the opposite of the desired second direction 30 of movement. The spring motor 112 restricts this undesirable movement by maintaining the drive shaft 104 in position as the second spool member 172 counterrotates back to the start position. In addition, the second clutch member 174 facilitates counterrotation of the second spool member 172 without back rotation of the drive shaft 104. As the second spool member 172 counterrotates in the first direction, back to the start position, the second clutch member 174 disengages the drive shaft 104. Thus, the second spool member 172 and the second clutch member 174 counterrotate relative to the drive shaft 104. The second cord 152***b* retracts into the actuation assembly 164, where it is wound back onto the second spool member 172. The user can then repeat the process of actuating the second wand 156*b* to pull the second cord 152*b*, further raising the bottom rail 18 in the second direction 30 until reaching a desired position. As the bottom rail 18 is moved toward from the headrail 14 in the second direction 30, the window shade panel 22 retracts.

It should be appreciated that the first and second systems of operation can be used separately or together for different applications of the window covering 10. As a non-limiting example, in one example of embodiment, the window covering 10 may be in a position where the bottom rail 18 cannot be physically reached by a user. For example, the window covering 10 could be covering a tall window (or architectural opening), and the bottom rail 18 could be at a position closer in proximity to the headrail 14. In this embodiment, the user can use both the first and second systems of operation to adjust a position of the bottom rail 18 relative to the headrail 14 to establish a desired configuration for the window covering 10. The user can utilize the second system of operation by actuating the first wand assembly 150*a* to move the bottom rail 18 in the first direction 26 (away from the headrail 14). The user can actuate the first wand assembly 150*a* until the bottom rail 18 reaches a position that the user can grasp the bottom rail 18. The user can then transition to the first system of operation by manually grasping the bottom rail 18 and manually adjust the bottom rail 18 to a position to achieve a desired arrangement of the window shade panel 22.

As another example of an embodiment, the user can utilize the first system of operation and manually grasp the bottom rail 18 to manually adjust the bottom rail 18 to a desired position relative to the headrail 14. The user can then transition to the second system of operation to fully retract the window shade panel 22. More specifically, the user can actuate the second wand assembly 150*b* to move the bottom rail 18 in the second direction 30 (towards the headrail 14). The user can actuate the second wand assembly 150*b* until the bottom rail 18 reaches a position to achieve a desired arrangement of the window shade panel 22.

The hybrid retractable lift system 100 advantageously provides for two methods of operation (or dual operation) of the window covering 10. This is desirable for certain installations, such as a tall window where a user cannot reach the bottom rail 18 when the window shade panel 22 is in a retracted position. The user can actuate the appropriate wand assembly 150*a, b* to lower the bottom rail 18 to either a desired position or a position where the bottom rail 18 can be grasped by the user. The user can then manually reposition the bottom rail 18 to a desired location, or the user can further actuate the appropriate wand assembly 150*a, b* to further raise or lower the bottom rail 18 relative to the head rail 14.

In addition, the hybrid retractable lift system 100 advantageously eliminates the need for positional timing components that are configured to limit downward operation of the retractable dual cord lift assembly 116. Such timing mechanisms are generally used in the art to prevent the lift drum 120 of the cord cradle assembly 108 from unwinding past a limit, potentially adversely causing the associated lift cords 128 to backwind (or wind in the opposite direction as designed). The spring motor 112 provides the necessary tension to restrict back driving of the drive shaft 104. Stated another way, the spring motor 112 holds the shade in place as each spool member 168, 172 respectively travels from the end position back to the start position. Further, the spring motor 112 acts as a positional limit to the bottom rail 18. More specifically, if the bottom rail 18 is positioned to a lower limit position, the spring motor 112 will retract the lift cords 128 onto the lift drum 120, preventing the lift cords 128 from backwinding onto the lift drum 120. Elimination of positional timing components, such as throttle springs in the retractable cord lift assembly 116, simplifies both operation and design of the lift system 100. These and other advantages are realized by the disclosure provided herein.

What is claimed is:

1. A window covering comprising:
a first rail;
a second rail moveable relative to the first rail;
a drive shaft received by the first rail;
a spring motor operably connected to the drive shaft, the spring motor configured to apply tension to the drive shaft to assist with maintaining a position of the second rail relative to the first rail;
a lift drum operably connected to the drive shaft;
a lift cord extending between the lift drum and the second rail; and
a retractable cord lift assembly operably connected to the drive shaft, the retractable cord lift assembly including a spool member operably connected to a wand assembly by a cord, a clutch connected to the spool member, the clutch configured to selectively engage the drive shaft,
wherein in a first operational configuration, the second rail is configured to be manually repositioned relative to the first rail, and in response the drive shaft is configured to rotate relative to the clutch in a first direction and a second direction, and
wherein in a second operational configuration, actuation of the wand assembly is configured to rotate the spool member in the first direction, and in response the clutch is configured to engage the drive shaft to rotate the drive shaft in the first direction, moving the second rail relative to the first rail.

2. The window covering of claim 1, the retractable cord lift assembly further comprising a biasing member configured to apply a biasing force to the spool member.

3. The window covering of claim 2, wherein actuation of the wand assembly overcomes the biasing force applied to the spool member.

4. The window covering of claim 2, wherein actuation of the wand assembly is configured to rotate the spool member in a first direction from a start position to an end position.

5. The window covering of claim 4, wherein in response to the spool member rotating to the end position, the biasing member is configured to counterrotate the spool member from the end position back to the start position.

6. The window covering of claim 5, wherein in response to the spool member counterrotating from the end position back to the start position, the clutch disengages from the drive shaft.

7. The window covering of claim 6, wherein in response to the clutch disengaging from the drive shaft, the clutch and the spool member counterrotate relative to the drive shaft.

8. The window covering of claim 7, wherein the clutch and the spool member counterrotate in the second direction, opposite the first direction.

9. The window covering of claim 7, wherein the spring motor applies tension to the drive shaft to assist with maintaining a position of the second rail relative to the first rail as the clutch and the spool member counterrotate.

10. The window covering of claim 7, wherein the spring motor applies tension to the drive shaft to minimize back driving of the drive shaft as the clutch and the spool member counterrotate.

11. The window covering of claim 1, wherein the clutch is concentric with the spool member.

12. The window covering of claim 1, wherein in response to rotation of the drive shaft in the first direction, the second rail moves away from the first rail.

13. The window covering of claim 1, wherein in response to rotation of the drive shaft in the first direction, the second rail moves towards the first rail.

14. The window covering of claim 1, further comprising a shade panel extending between the first rail and the second rail.

15. The window covering of claim 1, wherein actuation of the wand assembly is configured to rotate the spool member in a first direction from a start position to an end position, wherein in response to rotation of the spool member reaching the end position:

a biasing member applies a biasing force to the spool member rotating the spool member in the second direction, the clutch member disengages the drive shaft such that the spool member and clutch member rotate relative to the drive shaft, and the spring motor limits back driving of the drive shaft.

16. The window covering of claim 1, the retractable cord lift assembly further comprising:

a second spool member operably connected to a second wand assembly by a second cord, a second clutch connected to the second spool member, the second clutch configured to selectively engage the drive shaft, wherein in the first operational configuration, the drive shaft is configured to rotate relative to the clutch and the second clutch in both the first direction and the second direction, and wherein in the second operational configuration, actuation of the second wand assembly is configured to rotate the second spool member in the second direction, and in response the second clutch is configured to engage the drive shaft to rotate the drive shaft in the second direction, moving the second rail relative to the first rail.

17. A window covering comprising:

a first rail;

a second rail moveable relative to the first rail;

a drive shaft received by the first rail;

a spring motor operably connected to the drive shaft, the spring motor configured to apply tension to the drive shaft to assist with maintaining a position of the second rail relative to the first rail; and a retractable cord lift assembly operably connected to the drive shaft, the retractable cord lift assembly including a first spool member operably connected to a first wand assembly by a first cord, a first clutch connected to the first spool member, the first clutch configured to selectively engage the drive shaft, and a second spool member operably connected to a second wand assembly by a second cord, a second clutch connected to the second spool member, the second clutch configured to selectively engage the drive shaft, wherein in a first operational configuration, the second rail is configured to be manually repositioned relative to the first rail, and in response the drive shaft is configured to rotate relative to the first clutch and the second clutch in both a first direction and a second direction, and wherein in a second operational configuration, actuation of the first wand assembly is configured to rotate the first spool member in the first direction, and in response the first clutch is configured to engage the drive shaft to rotate the drive shaft in the first direction, moving the second rail towards the first rail, and actuation of the second wand assembly is configured to rotate the second spool member in the second direction, and in response the second clutch is configured to engage the drive shaft to rotate the drive shaft in the second direction, moving the second rail away from the first rail.

18. The window covering of claim 17, wherein the first clutch is concentric with the first spool member, and the second clutch is concentric with the second spool member.

19. The window covering of claim 17, wherein actuation of the first wand assembly is configured to rotate the first spool member in the first direction from a start position to an end position, the first spool member is biased to rotate in the second direction towards the start position, and in response to rotation of the first spool member in the second direction, the first clutch disengages the drive shaft such that the first spool member and the first clutch rotate relative to the stationary drive shaft.

20. The window covering of claim 19, wherein actuation of the second wand assembly is configured to rotate the second spool member in the second direction from a start position to an end position, the second spool member is biased to rotate in the first direction towards the start position, and in response to rotation of the second spool member in the first direction, the second clutch disengages the drive shaft such that the second spool member and the second clutch rotate relative to the stationary drive shaft.

21. The window covering of claim 20, wherein in response to rotation of the first spool member in the second direction, the spring motor applies a force to the drive shaft to restrict rotation of the drive shaft in the second direction, and wherein in response to rotation of the second spool member in the first direction, the spring motor applies a force to the drive shaft to restrict rotation of the drive shaft in the first direction.

* * * * *